(12) United States Patent
Ursitti et al.

(10) Patent No.: US 7,676,455 B2
(45) Date of Patent: Mar. 9, 2010

(54) IDENTIFYING AND/OR EXTRACTING DATA IN CONNECTION WITH CREATING OR UPDATING A RECORD IN A DATABASE

(75) Inventors: Michael A. Ursitti, Califon, NJ (US); Jupiter Bridge, Lambertville, NJ (US)

(73) Assignee: Bloomberg Finance L.P., New York, NY (US)

( * ) Notice: Subject to any disclaimer, the term of this patent is extended or adjusted under 35 U.S.C. 154(b) by 389 days.

(21) Appl. No.: 11/347,146

(22) Filed: Feb. 3, 2006

(65) Prior Publication Data

US 2007/0185835 A1    Aug. 9, 2007

(51) Int. Cl.
*G06F 17/30* (2006.01)
*G06F 17/00* (2006.01)
*G09G 5/00* (2006.01)

(52) U.S. Cl. .................. 707/3; 715/255; 345/156; 345/685

(58) Field of Classification Search .............. 707/2, 707/102, 101, 7, 10, 104, 1, 3; 715/255–272
See application file for complete search history.

(56) References Cited

U.S. PATENT DOCUMENTS

| | | | |
|---|---|---|---|
| 5,920,867 A | 7/1999 | Van Huben et al. | |
| 6,397,211 B1 * | 5/2002 | Cooper | 707/3 |
| 6,704,733 B2 * | 3/2004 | Clark et al. | 707/10 |
| 6,862,713 B1 * | 3/2005 | Kraft et al. | 715/728 |
| 2003/0158854 A1 * | 8/2003 | Yoshida et al. | 707/101 |
| 2003/0158855 A1 | 8/2003 | Farnham et al. | |
| 2005/0028087 A1 | 2/2005 | Barrie et al. | |
| 2006/0075331 A1 * | 4/2006 | Itani | 715/513 |
| 2006/0101017 A1 * | 5/2006 | Eder | 707/7 |
| 2006/0156222 A1 | 7/2006 | Chi et al. | |
| 2006/0230012 A1 * | 10/2006 | Ruvolo et al. | 707/1 |

* cited by examiner

*Primary Examiner*—Tim T Vo
*Assistant Examiner*—Bao G Tran
(74) *Attorney, Agent, or Firm*—Frank J. DeRosa; Jon Gordon; Frommer Lawrence & Haug LLP

(57) ABSTRACT

The invention provides systems, methods, and computer programs to improve the accuracy and efficiency with which data analysts can use news stories, press releases, and other sources of information to maintain databases that contain information about individuals and businesses and other organizations. Documents containing material information are acquired in computer-readable form and optionally may then be reduced to raw text. One or more computerized systems process the text and tag important terms such as proper nouns, job titles, awards, and other terms indicating professional, educational, corporate, or other developments. The invention provides a user interface with which a data analyst can review, confirm, remove, modify, introduce, and link the tags, ultimately adding the information and links to a database and storing the source document in an electronic warehouse for future retrieval.

15 Claims, 10 Drawing Sheets

PRN 06/17
Stans Succeeds Jones as Chairman and CEO of
Amalgamated Communications
  DENVER, June 17 /PRNewswire-FirstCall/ --
Amalgamated Communications
International Inc. (NYSE: M) announced today that its
Board of Directors has unanimously [elected Richard C.
Stans,] former chairman and CEO of Comm Corporation,
as its chairman and CEO, effective today. Stans succeeds
Jospeh P. Jones, who voluntarily resigned from his
position as chairman and CEO and from the Board. Jones
has agreed to serve as a consultant to the company for up to
two years, to assist in transition, strategy, planning and
other matters of importance to the company. At the same
time, Philip H. Smith resigned as non-executive chairman
of the board. Smith remains a director and chairman of the
executive committee of the board.
  The company plans no changes in strategy or operations.
Smith said, "When Joe Jones came on board in 1997,
Amalgamated was a very different company. We had a
foundation, but needed a leader to bring technology and a
vision to life and grow Amalgamated into a full-service
communications company. Few companies have attempted
to achieve so much and even fewer have ever accomplished
such a goal. Joe Jones did that and more-he brought a
renewed focus on customer service and prepared us for re-
entry into the long distance business. We wish him well."
  Richard Roe, a Amalgamated board member and
chairman of the compensation committee, said, "Our initial
vision is intact. We have great talent and our operations
are strong. We must now focus on rebuilding shareholder
value and ensuring that Amalgamated's employees,
partners and customers can benefit from our strengths."
Roe continued, "we need an experienced new leader with
strong operational skills for the next phase of the
company's development. We are fortunate to have attracted
someone of Dick Stans' stature and experience. The board
believes Dick is the right CEO to leave Amalgamated as it
taks full advantage of its unique assets and market position
for the benefit of all stakeholders.
  Joe Jones said, I am proud of all that we have
accomplished in bringing Amalgamated to this point. After
criss-crossing the globe for five and one-half grueling years
to build Amalgamated, living in two different cities, and
having achieved our major goals, I have expressed my
desire to spend more time with my family and pursue other
opportunities."
  Jones continue, "the company's fundamentals are strong
and it will have enormous opportunities in the period ahead
as Amalgamated reduces debt and as the regional economy
recovers. Operationally, Amalgamated's local service
results are at record highs, long-distance approval is within
reach and Amalgamated has the infrastructure in place to

| EDU | AWRD | CERT | HOBS | PUBS |
| NAME | CMPY | TITL | HIST | COMP | MEMB |

TITLE

Name Look-Up
3177222 EDMOND F. STANS
         NATIONAL HOSPITAL FOUNDATION
1390199 RICHARD C. STANS "DICK"
         RESEARCH INC.
1447503 RICHARD J. STANS JR
         EASTERN BANCORP INC.

Company Look-Up
1039060 AMALGAMATED COMMUNICATIONS Seattle
312788  AMALGAMATED COMMUNICATIONS INTL
        Denver
939475  AMALGAMATED CYBERSOLUTIONS LLC
        Denver
1106115 AMALGAMATED DIGITAL MEDIA Washington
1100305 AMALGAMATED ENERGY CORP    Vancouver
521536  AMALGAMATED RECORDS INC
994089  AMALGAMATED WIRELESS LLC   Denver Title Look-Up
51605   Attorney
53487   Banker
52619   Board Member
2986    Broker
11      Chairman
52317   Chief Accounting Officer
6000420 Chief Administrative Officer
6000256 Chief Executive Officer
600401  Chief Financial Officer
6882    Chief Information Officer
51599   Chief Investment Officer Start Date        End Date
JUNE 2002         PRESENT Next       View Records
Prev       Commit Records

FIG. 4

IDENTIFYING AND/OR EXTRACTING DATA IN CONNECTION WITH CREATING OR UPDATING A RECORD IN A DATABASE

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent files or records, but otherwise reserves all copyrights whatsoever.

BACKGROUND

The present invention relates to computerized systems and methods and computer products that may be used to create or update database records. Embodiments of such systems, methods, and products may, for example, identify information in electronic documents (which may have been converted from print documents) relating to the subject matter of a database, extract such information, and update or create a record or otherwise populate the database with such information. In a particular embodiment, the database stores business-related news about individuals which is updated with information identified and extracted from news stories and reports, press releases, agency and administrative filings such as SEC filings, and other sources of information.

The invention has application to systems and services such as the BLOOMBERG PROFESSIONAL® Service, which currently provides, among other things, financial, business, and legal information and news.

Providing and updating such information require constant review of new and altered data in forms such as, for example, news, reports, articles, governmental filings (including administrative filings), records of proceedings, press releases, government records (including, e.g., corporate records). New information continues to multiply, however, often with consequent growth of the editorial staff that reviews the information.

SUMMARY

The invention applies to, but is not limited to, the process of receiving and electronically publishing information. An embodiment of the invention applies specifically to electronic publication of business-related information. Information to which the invention has application may be received in various electronic and non-electronic formats, e.g., as news, reports, articles, government (including administrative) filings, records of proceedings, press releases, government (e.g., corporate) records, and in other formats, from various sources. Instances of information in electronic and non-electronic formats are referred to herein as documents.

Embodiments of the invention provide for subjecting information to some form of automated processing and then providing it to a database or databases, for purposes comprising creating or updating records, documents, files, etc., therein. For example, information may be subjected to analysis to identify information that is relevant to a database or databases, and then information so identified to be relevant may be provided to the database or databases. Some embodiments of the invention provide a user interface for subjecting the information to human analysis, after which suitable information is provided to a database or databases.

For example, information about organizations and about individuals is currently provided by various organizations (or vendors, services, etc.) in the business of retrieving, acquiring, storing and/or providing such information, e.g., the BLOOMBERG PROFESSIONAL® Service provided by Bloomberg LP. This information may comprise the nature of an organization (e.g., public corporation, private corporation, non-profit corporation, partnership, governmental unit, etc.), the addresses of one or more offices or facilities, the names of the directors, officers, and managers, and the activities and lines of business of the organization, among other things. For an individual, this information may comprise the individual's name, age, educational history, employment history, job titles, publications, awards and honors, and other biographical information.

Information of this nature is subject to change, e.g., in the course of business and careers. Changes in this information may be found in various formats, including formats of the type described above. Embodiments of the invention assist organizations in maintaining their database(s) of such information, e.g., by keeping such information current.

Embodiments of the invention provide methods, systems, and computer programs and program products to automate, at least in part, the process of identifying relevant information to be provided to a database that, e.g., stores information of the type described herein, and to provide information identified to be relevant to the concerned database. The information to be identified may be provided in various formats, as mentioned above. In an embodiment of the invention, a human analyst is involved in the identification process. In this embodiment, possibly relevant information is automatically identified and presented, e.g., via a user interface, to an analyst, who determines or confirms actual relevancy, after which the information identified as relevant is provided to the database. For example, electronic information is automatically analyzed, possibly relevant information is automatically identified, and the possibly relevant information is presented to a human analyst. The analyst may react to the presented possibly relevant information so that information is or is not provided to the database, e.g., by accepting the presented information as presented, rejecting the presented information, or accepting modified presented information, e.g., as modified by the analyst. Accepted information is provided to the database, which can then be updated.

In an embodiment of a user interface, the user interface may present possibly relevant information to an analyst and comprise, for example, editing tools to facilitate modification of the presented information by the analyst and selectable functionality, e.g., allowing use of a pointing device such as a mouse to accept or reject presented information.

Embodiments of the invention provide systems, methods, and computer programs and program products for identifying a term or terms in electronic documents related to information relevant to a database, which in one embodiment includes significant events affecting individuals, organizations, or both. Some embodiments comprise "text analysis," in which terms signifying entities and events, such as individuals, organizations, or job titles, are separately identified. Some embodiments comprise providing metadata for the identified terms, which may permit automatic presentation of the identified terms to an analyst or automatic updates of one or more databases. "Tagging" is a term commonly used to describe providing metadata, including for textual data. ("Identify" is used herein in a broad sense, and depending on the context, encompasses finding a feature of a document—e.g., a term or terms, a relationship, grammatical structure, and/or context, among other possibilities; indicating a feature thus found; or both.)

Some terms may signify an event, such as, for example, a change in management at a corporation. A proper name such as "Jane Smith" would signify an individual, while a different sort of proper name such as "Amalgamated Corporation" would identify an organization. Terms such as "promoted," "position," "Chairman," and "Chief Executive Officer" may signify events such as changes in management at an organization. The proximity of all these terms to each other may indicate that they all relate to a common event, as may the grammatical structure of the sentence or sentences in which they appear.

Identifying significant terms and their relationships to one another creates information about the contents of the document. This information is an example of metadata, which means, generally, data that describe other data. A common way to record metadata concerning a document is in the document itself, using, e.g., a markup language to describe the document's context. (The term "markup language" is used herein in a broad sense that comprises a formal set of symbols and rules used to annotate a paper or electronic document to indicate its structure and the nature of its data.)

A markup language well known in the art and used extensively for electronic documents is the eXtensible Markup Language, also known as XML. In some embodiments, XML is used to indicate the significant terms identified in an electronic document. In some embodiments, XML may also be used to indicate the relationships between those terms. The fundamental elements of XML markup are called "tags," which is consistent with the use of the word "tagging" above.

Some embodiments may also provide for continuously processing documents containing information that may be relevant to a concerned database. Such documents may also be gathered for storage. As mentioned, documents can be obtained electronically from multiple sources. Paper documents can also be scanned and then processed with character recognition software to obtain electronic versions that can be further processed according to embodiments of the invention.

Documents as first acquired may already contain markup, metadata, or other data that does not form the text of the document and which is referred to herein as "non-textual data," "non-textual information," and/or "non-textual content." Some embodiments may comprise text analysis engines and/or tagging engines that use this information to improve their performance and reliability. Some other embodiments may comprise text analysis engines and/or tagging engines that operate only on the textual content of the documents, and those embodiments may also include a preprocessing stage of stripping the documents of any markup or metadata so that the raw-text text analysis engines and/or tagging engines can operate on raw text.

In some embodiments of the invention, once the document has been tagged and possible relationships have been identified between the tagged terms, the document is presented via an electronic display device to a data analyst. The analyst reviews the automated tagging and identification of events. Using a computer input device or devices, such as, in some embodiments, a pointing device such as a computer mouse, a keyboard, or both, the data analyst can accept or reject the automatic identifications.

Preferably, in addition to or in lieu of presenting the document, a user interface presents a relevant portion or portions of the document and may using text processing tools, e.g., text contrasting (such as highlighting), to assist in or enhance the presentation of relevant terms.

The tagging process may result in the tagging of terms that refer to specific individuals, organizations, places, and/or other tangible or intangible things. In some embodiments of the invention, the databases being updated will include one or more databases that contain information about the kinds of entities to which those terms refer. In those embodiments, tagging may be followed by searching those databases for records that may correspond to the tagged terms and retrieving any such records that are found. When that occurs, the electronic display device may also display, in connection with one or more terms, a list of entities found in the one or more databases that may correspond with a particular term. Using a computer input device, the data analyst can link each term with the correct database record. Preferably, a user interface is provided to facilitate the linking process.

For example, in one embodiment, the tagging engine may tag an individual, an organization, a job title, and one or more keywords such as "hired" in the same sentence. Using preconfigured rules, the engine creates a record for an event and then associates each of these terms with that event. A search is then performed in the associated database or databases for information about the individual and the organization. In this embodiment, a user interface appears on an electronic display device, providing a representation of the source document in which the tagged terms are, e.g. highlighted, and further highlighting indicates that these terms are all associated with a single event. The data analyst uses an input device, such as a keyboard, computer mouse, or both to identify the correct individual and organization from potential matches identified during the database search. The data analyst may also provide further input, such as, for example, assigning a date range to the event or confirming such a range that has already been tagged.

When the data analyst signifies using the computer input device(s) that the event is correct, a potential transaction is created that can be committed to one or more databases. The analyst may also reject an event entirely, in which case no such potential transaction is created. A source document may contain more than one of the events described above, and, in such cases, the data analyst will create a potential transaction for each event that the analyst accepts. When the data analyst finishes reviewing the source document, the data analyst signifies using the computer input device(s) that each potential transaction should be committed to the corresponding database or databases.

In some embodiments of the invention, each updated database record is linked to the source of the information that was used to update it. In those embodiments, the source document itself is stored electronically in a document archive or warehouse from which it may later be retrieved, and updating the concerned database(s) includes storing a link between the updated database record(s) and the electronic source document. Some such embodiments also store a link to the specific text within each such document that was the source of the information used to update the database.

In an embodiment of the invention, a user interface permits simultaneous presentation of two or more windows on the same or different displays. For example, documents to be processed (or identified portions thereof) may be presented in one window, while other, related information appears in another window. In an embodiment as described above, in which the data analyst confirms links between specific entities identified in a document with corresponding database records, information from a selected candidate record and the document are presented simultaneously in different windows.

For example, when the data analyst is confirming the identity of a specific individual named, e.g., in a tagged term in the document, the user interface presented in one window includes a list of individuals found in the database whose names match or resemble the name found in the source document. When the data analyst uses a computer input device to select one record from the list, biographical information from the selected record will appear in the other window. Based on that information, the analyst may confirm that this is the correct individual or select another record and try again.

In some embodiments of the invention, a user is able to create and/or modify tags as well as to accept, reject, and/or link them. Modification of a tag comprises, for example, altering its content or relation to one or more other tags or changing the position of a tag within the electronic document.

In another embodiment, an analyst may edit text (e.g., add, modify, and/or delete text) presented from the source document before that text is committed to one or more databases, and the edited text becomes tagged as described for the identified text above, and may further be linked, as above. A visual indication of the new edited text, e.g., highlighting, may then be presented as well.

In some embodiments, the invention provides a user interface to a data analyst that allows the analyst to review the transactions created while processing a presented document or portions thereof. The data analyst may add, change, or delete transactions that appear, e.g., on a list. When the data analyst approves the list of transactions, the transactions are committed to the database. In some embodiments, to help ensure the correctness of the contents of the transactions, the transactions may be committed to the database only after the review by an analyst.

BRIEF DESCRIPTION OF THE DRAWINGS

The invention is illustrated in the figures of the accompanying drawings, which are meant to be exemplary and not limiting, in which like references are intended to refer to like or corresponding things.

FIG. 4 depicts a user interface screen used by a data analyst to extract data from newly acquired documents and update databases accordingly.

DETAILED DESCRIPTION OF THE PREFERRED EMBODIMENTS

Preferred embodiments of the invention are described through reference to the figures.

Figure 1:
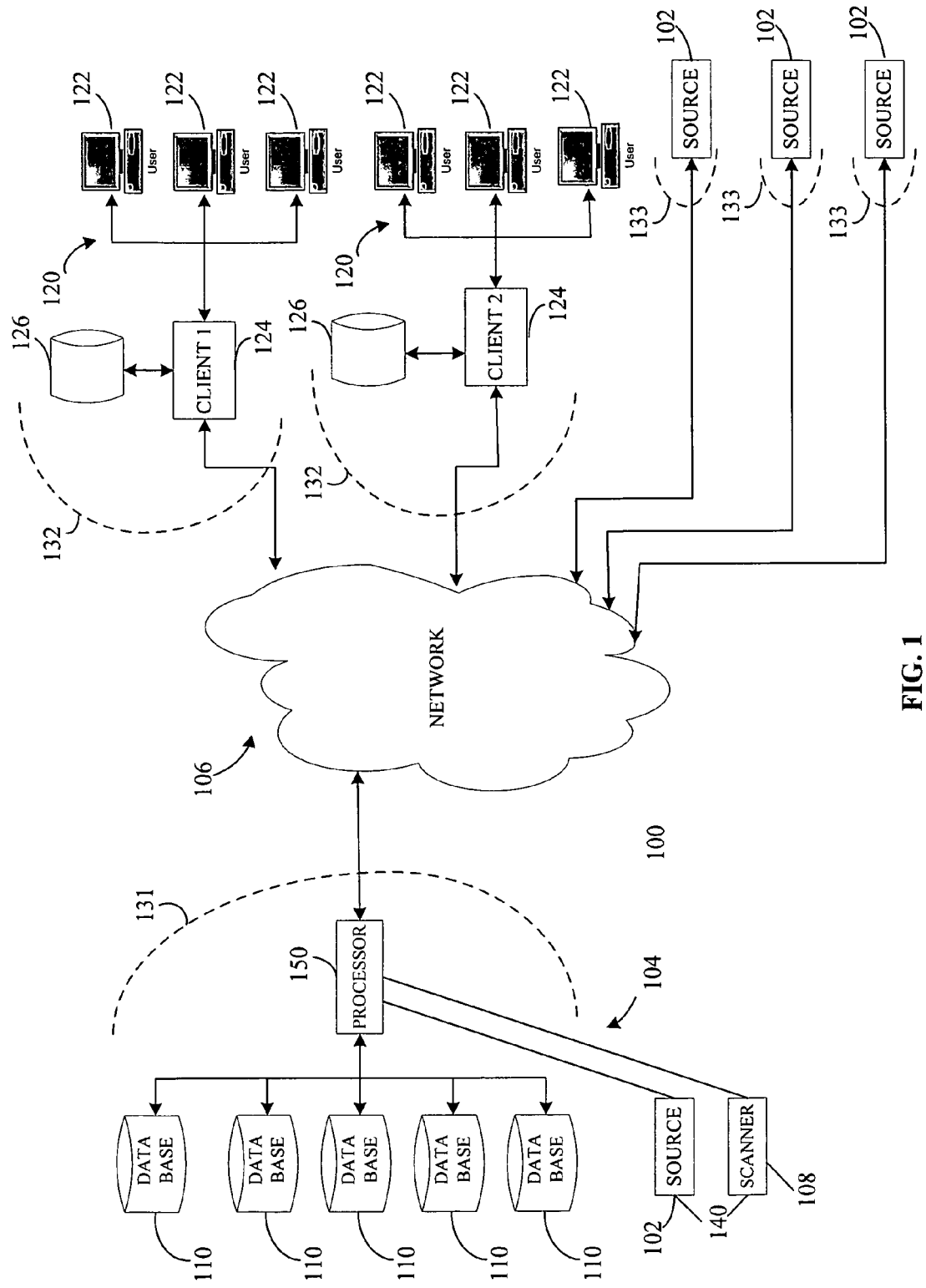
FIG. 1 depicts a preferred embodiment of a system for gathering, maintaining, and providing information according to the invention.

FIG. 1 is a schematic diagram of a preferred embodiment of a system for gathering, maintaining, and providing (e.g., distributing) information according to the invention.

System 100 comprises a plurality of information sources 102 which provide, for example, current, up to date news and information related to a wide variety of business-related topics to a business information provider system 104. Sources 102 may include, for example, SEC filings, press releases, news wires, data feeds from exchanges, web crawlers, and other business, professional, or news information.

Sources 102 provide information to provider system 104 via network 106, possibly in a standard format that is easily and rapidly useable by provider system 104, according to a protocol established by or agreed to by provider system 104. Data provided in non-standard formats may require normalization before processing, and data provided as printed information may be converted to electronic format by a scanner 108. Information provided by sources 102 to provider system 104 is processed as required and stored in databases 110, and made available to requesting clients at user systems 120, each of which comprises one or more user-accessible terminals 122.

Requester user systems 120 may comprise systems that are used by administrative and other special classes of requesting users, and may include one or more other users or user-accessible terminals 122 designated by the requesting users for receipt of current awareness or other information. Requesting users may designate their own systems for receipt of requested information. Requesting user systems 120 optionally comprise one or more client servers or other computers or processors 124, and databases or other memories 126 controlled by the user system 120.

System 100 may comprise or operate with any useful or required communications networks, such as the Internet and/or any combinations of local-area or wide-area networks (LANs or WANs) or electronic communications networks (ECNs), including any line or telecommunications facilities for linking, networks through security firewalls or other devices, and routers and the like, to large numbers of remote user terminals or user networks.

Optionally sources 102, provider system 104, and requesting user systems 120 each may be protected by data firewalls, gateways, and other data and system security measures 131, 132, 133.

In some embodiments, there may also be internal sources 140 of documents. These sources may be controlled by the same provider that controls the provider system 104, and may communicate with the processor 150 without mediation by a gateway or firewall 131.

System 100 of FIG. 1 is an example of an architecture suitable for implementing processes according to the invention. As will be apparent to those skilled in the implementation of such systems, many other forms of architecture, including the use of one or more third-party database providers, or intermediary systems, may be used.

Figure 2:
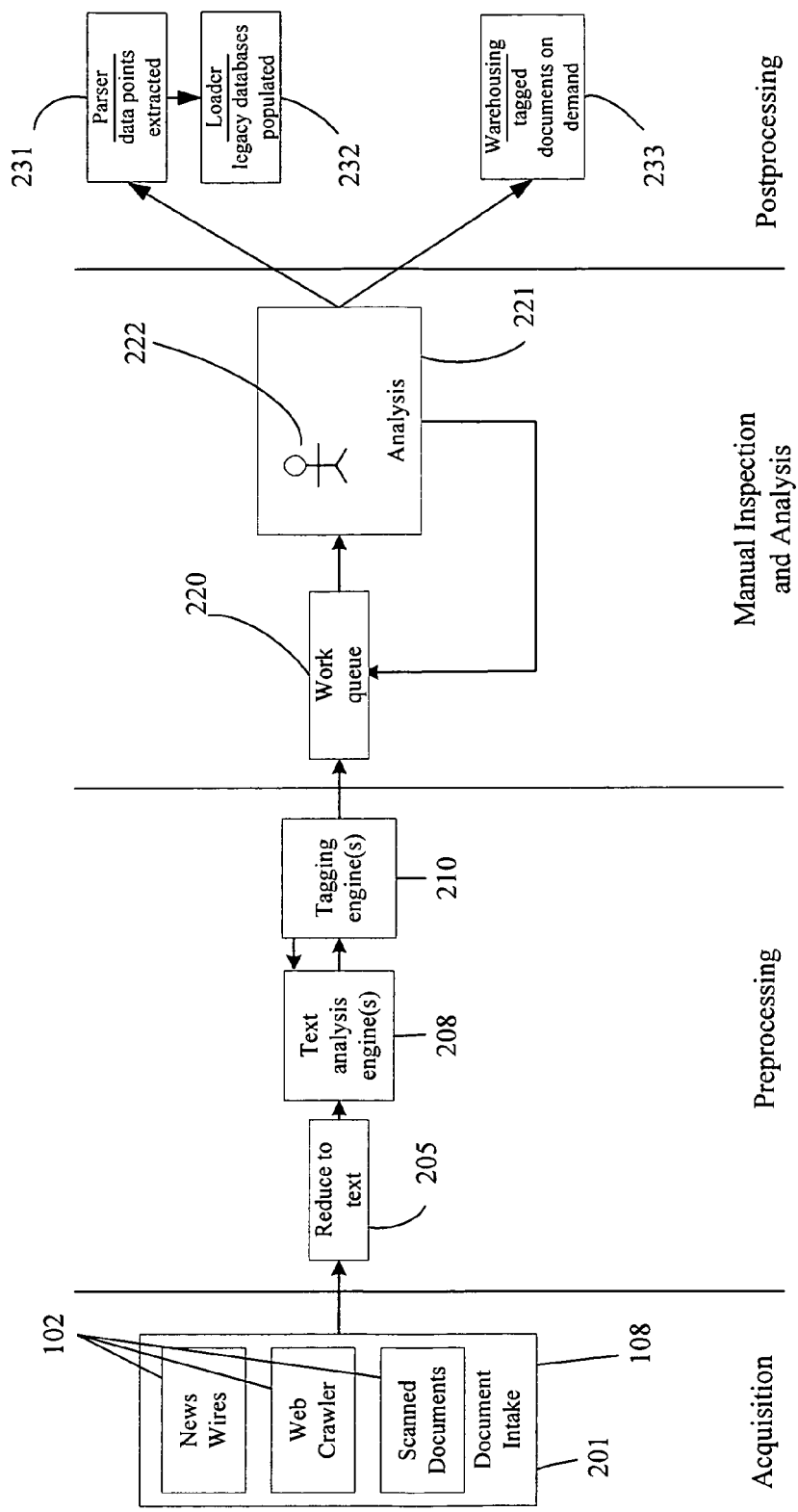
FIGS. 2 and 3 depict an information flow according to a preferred embodiment of a system for gathering, maintaining, and providing information according to the invention.

A process for gathering and analyzing information according to an embodiment of the invention is shown in FIG. 2. Process 200 of FIG. 2 is shown in an embodiment suitable for implementation by one or more information sources 102, an information provider system 104 (FIG. 1), and one or more information requesting users 120 comprising one or more user-accessible terminals 122, as shown in FIG. 1.

At 201 source 102 (which may include an affiliate of provider system 104, as well as any third parties) takes in a new document. A document, in this sense, includes any information relating to topics of interest to requesting users 120, whether in the form of a paper document of one or more pages; one or more electronic data files; or any other form suitable for an implementation of the invention. Documents may be gathered or received, in physical, electronic, or any other form, by sources 102 by delivery from outside parties, such as news reporting agencies, authors, government agencies, etc.; or they may be created by a source 102. The system may acquire printed documents through a scanner 108.

Block 205 represents optional reduction of the electronic source document to raw text. Text is raw if it contains no markup or other metadata or any non-textual information. For example, an acquired document could itself be marked up with XML before receipt from a source 102. Some embodiments comprise tagging engines that can use such prior markup to assist their own finding and indicating of terms. (A tagging engine may comprise one or more computer software programs and/or modules.) Some embodiments comprise tagging engines that ignore some or all prior markup, and such ignored prior markup does not interfere with the functioning of the tagging engines. Others, however, may comprise tagging engines that cannot accept such input, which may require the removal of some or all of the prior markup before tagging. Block 205 represents the removal of metadata in such embodiments.

A text analysis engine 208 is configured to receive the electronic source document and then find terms in the document that are deemed relevant to the kinds of information that are to be found through use of this system and then to use tags to indicate them. (A text analysis engine may comprise one or more computer software programs and/or modules.) In the preferred embodiment, the terms are related to changes in information about individuals and businesses. The text analysis engine 208 will identify terms such as proper nouns (e.g., names of people and businesses), titles (e.g., "chairman" or "CEO"), certain actions (e.g., "succeeds" or "resigned"), and other terms relevant to the business world (e.g., "compensation committee" or "position").

A tagging engine 210 receives the electronic source document and refers to the text analysis engine 208 to mark up the text to indicate the results of the analysis. In this embodiment, XML is used for markup, but other forms of markup may also be used. Tagging and text analysis engines are well known in the art and are commercially available from several different vendors, including Verity, Inc., ClearForest Corporation, and Entrieva, Inc.

It will be apparent to one skilled in the art that one or more text analysis engines and one or more tagging engines may be associated with one another in different ways in different embodiments. For example, some embodiments are configured so that a text analysis engine may complete its processing of the electronic source document before an associated tagging engine begins to process that document. Some other embodiments are configured so that one or more text analysis engines may work incrementally, processing one or more parts of the electronic source document in tandem with one or more tagging engines. Still other embodiments may use one or more integrated text analysis and tagging engines (not pictured), in which one or more logical units performs both functions.

Figure 3:
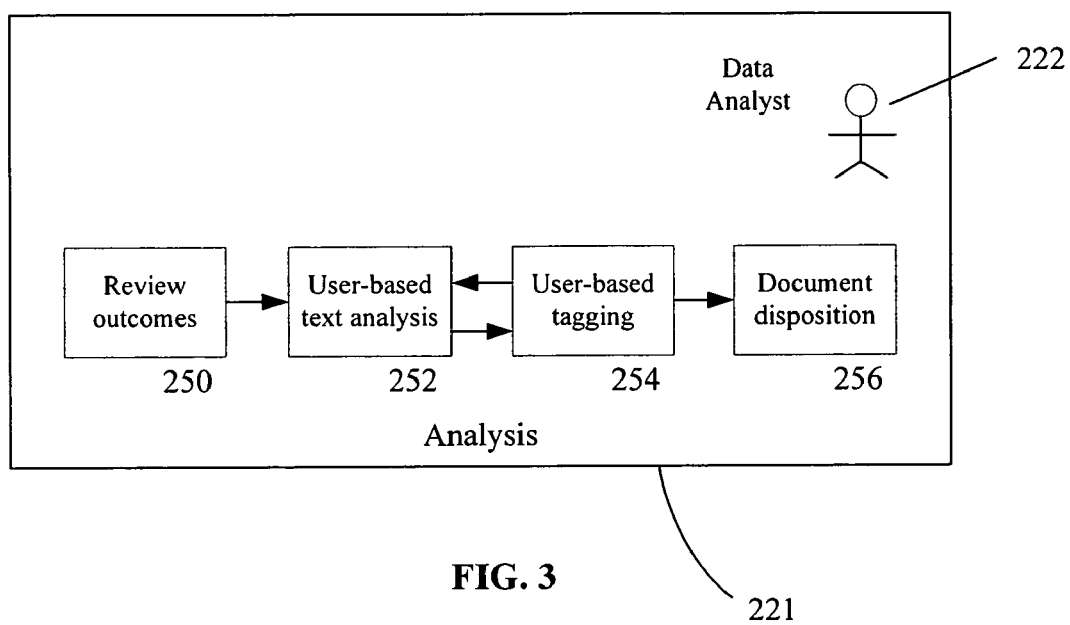

Tagged documents enter the work queue 220, where they await analysis 221 from an analyst 222. FIG. 3 depicts the details of analysis 221.

As shown in FIG. 3, using a computer, the analyst 222 is presented with an interface substantially as shown in FIG. 4, discussed below. The analyst 222 uses the tools provided by this user interface to process 250 the output of the tagging engines 210. In the preferred embodiment, "to process" means to review the tagged information and to associate the proper items with database records and with each other.

For example, the analyst 222 may find a tagged term that is the name of a corporate executive. From the context, represented in the tag's attributes, the system may determine that this part of the document is about a new title for this person.

Using the tools provided by the user interface, the analyst 222 further reviews the document to identify the precise entity that the person works for, the new title, and the start and end dates for that person's tenure in that position.

Other kinds of information can be identified. Financial data may be tagged if the document is an annual report or other filing with the Securities and Exchange Commission. A press release or news story may disclose the receipt of an award, or an educational attainment, and these developments may be tagged as well.

Some embodiments permit the analyst 222 to create new tags to supplement the automatically-created ones. In such embodiments, the analyst 222 may review 252 the document for additional information. Based on that review 252, the analyst 222 may manually tag the document 254. Manual tags may be inserted, for example, if a tagging engine fails to identify information or a relationship. Manual tagging 254 may comprise modifying or deleting tags created during automatic text analysis 208 (FIG. 2) and tagging 210 (FIG. 2).

After this review 250 and manual processing 252, 254, the analyst 222 proceeds to document disposition in block 256. The analyst may create a record reflecting the new relationship. The record represents a tentative database transaction that may be committed to one or more databases 110 (FIG. 1) on the analyst's command. When appropriate, though, the analyst may also return the document to the work queue 220 for further review by a supervisor.

Returning to FIG. 2, in some embodiments, when the analyst 222 chooses to commit the changes to the one or more databases, the system may do either or both of two more things. First, the approved changes are retrieved so that they may be used to update the one or more databases 110. The changes may be stored in several different forms, comprising for example, in a data structure in the memory of a computer system, or in one or more databases, or may be encoded as metadata or otherwise within the electronic source documents itself, in which case a parser 231 may extract the approved changes from the marked-up document.

After parsing, a loader 232 may use the extracted data to update databases 110 (FIG. 1) of information about individuals and business. The system may subsequently provide this information in response to requests from end users 122 (FIG. 1). In updating this information, the system records, typically in a database 110, the identity of the document that was the source for this information. This may permit later retrieval by the end users 122 of the sources for the data provided by the system.

Second, the tagged documents may themselves be warehoused 233 in one or more databases 110 to support such later retrieval. Depending on the embodiment, warehousing 233 may comprise stripping metadata and/or other non-textual data from the warehoused representation of the textual content of a document.

Other embodiments may behave differently following the user's decision to commit the changes. For example, in an embodiment, information about the identified relationships may be stored in the form of additional metadata associated with the document, instead of or in addition to updating the one or more databases 110.

Some embodiments may discard the electronic source documents instead of warehousing them.

The user interface screen 300, depicted in FIG. 4, is used in the preferred embodiment by an analyst 222 (FIG. 2) to extract data from newly acquired documents and update databases accordingly. This screen 300 appears on a display device attached to a computer workstation, and the analyst 222 uses it to confirm the system's identification of entities and events.

At the highest level, the screen 300 has two parts. One part is a document display area 301, in which the tagged document 302 appears. The system has acquired this document and processed it, in this embodiment through document intake 201, reduction to text 205, and tagging by one or more tagging engines 210, as illustrated in FIG. 2. If the document is too long to be displayed in the allocated area, a scroll bar 304 allows the analyst 222 to navigate through the entire document.

Because of the processing, the document contains several tagged terms 306. The system does not display the tags themselves to the analyst 222 to prevent unduly cluttering the interface. Nonetheless, the interface indicates the tagging by changing the appearance of the tagged terms 306. One scheme is to color-code the tagged terms 306 to indicate whether they relate to a person's taking a new position, leaving a current position, or the history of the person or position. Another scheme is to underline "trigger words," which are words that the tagging engine has been configured to recognize as potentially corresponding to material events. Still another scheme is to display proper names in boldface type the first time they appear. These schemes may be used alone or in combination with each other. Other ways to indicate the existence and significance of tagged terms are apparent to those skilled in the relevant arts.

The other part of the screen 300 is a tool display region 315 containing tools for identifying the entities that correspond to the tagged terms 306 in the tagged document 302.

In response to an analyst's 222 navigation to a tagged term 306, the system highlights the material event 317 that it has associated with that term. The tool display region 315 also changes to display tools and cues appropriate to the type of tagged term 306. FIG. 4 illustrates the tools that are available in this embodiment when the tagged term 306 represents a job title.

The interface cues the user to the type of tag by displaying a legend 322 showing that type.

The event 317 in the illustrated example is that of a person, Richard Stans, taking new positions, Chairman and CEO, with a corporation, Amalgamated Communications. In this case, the interface gives the analyst tools to identify precisely the individual 340, the company 355, and the title 357.

Because of the system's role in this embodiment as a provider of current and historical information about individuals and organizations, among its databases 110 (FIG. 1) are databases about individuals in the business world. Following the system's identification of the material event 317, it searches that database for names that match the tagged term. The screen then displays a list 340 of candidate names 341 in the database that match the term. The analyst selects the correct name 342, and the system causes that name to be highlighted in response.

At the top of the tool display region 315, there is a panel 350 of buttons 351, the labeling and function of which change depending on what kind of record is currently highlighted in the Name Look-Up region 340, the Company Look-Up region 355, or the Title Look-Up region 357. In the example illustrated in FIG. 4, an individual's name record 342 is currently selected, so the buttons 351 reflect achievements, actions, or events typical to an individual. By selecting one of these buttons 351, the analyst can override the system's determination of the type of event.

The system similarly looks up of candidate names of businesses that match the relevant tagged term. The screen includes a list 355 of matching names 360, and the analyst must select the right one. The system highlights the name in response to the selection, as above.

A list 357 is also provided of candidate titles 362 of positions within the business. The analyst selects the correct job title, confirming the title identified by the tagging engines 210 (FIG. 2). The interface also presents options for the analyst to set the dates at which the person started at a position 364, left a position 366, or both.

A panel of navigation buttons 370 is at the bottom of the tool display region 315. The "Next" button 371 and the "Prev" button 373 allow the analyst to move between the tagged terms in the document 302.

Each association of an individual, a business entity, a title, and a date or dates is considered a "transaction". The "View Records" button 372 replaces the screen 300 with a list of the transactions created by the analyst, such as the list screen 400 in FIG. 5. In this embodiment, the "Commit Records" button 374 is disabled on this screen 300, forcing the analyst to review the transactions on the list screen 400 before committing them to one or more of the databases. Another embodiment might allow the analyst to commit the transactions directly from screen 300.

Figure 5:
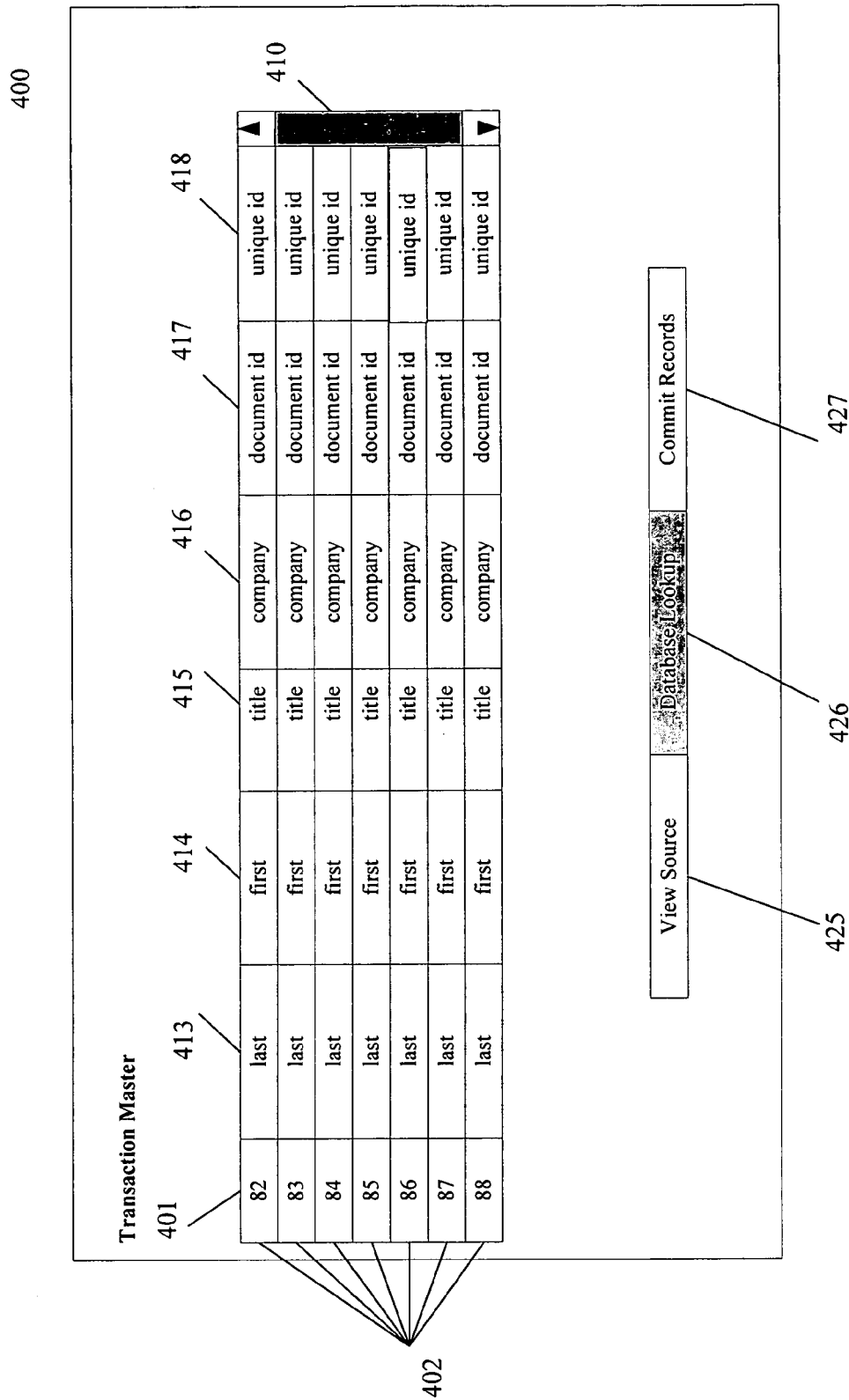
FIG. 5 depicts a user interface screen listing the transactions that an analyst has created while reviewing a tagged document.

In this embodiment, the user interface includes the list screen 400 shown in FIG. 5. This list screen 400 contains a spreadsheet-like list 401 of all transactions the analyst 222 (FIG. 2) created while working with a tagged document. Each transaction 402 is displayed in a single row of the list 401. If there are so many transactions that the list will not fit in the assigned area of list screen 400, a scroll bar 410 allows the analyst 222 to move forward and backward in the list.

In one embodiment, the list 401 contains for each transaction 402, the last name 413 and first name 414 of the individual involved in the transaction, the position title 415, the name of the organization involved 416, the nature of the source of the information 417 (indicated in FIG. 5 by the term "document id," and a code 418 (called the "unique id" in this embodiment), uniquely identifying the individual involved in this transaction.

At the bottom of the list screen 400 are three options for the analyst. If the analyst selects one of the transactions 402 and then selects the "Show Me" option 425, the system displays the document viewing screen 300 illustrated in FIG. 4, highlighting the text corresponding to the selected transaction.

Figure 6:
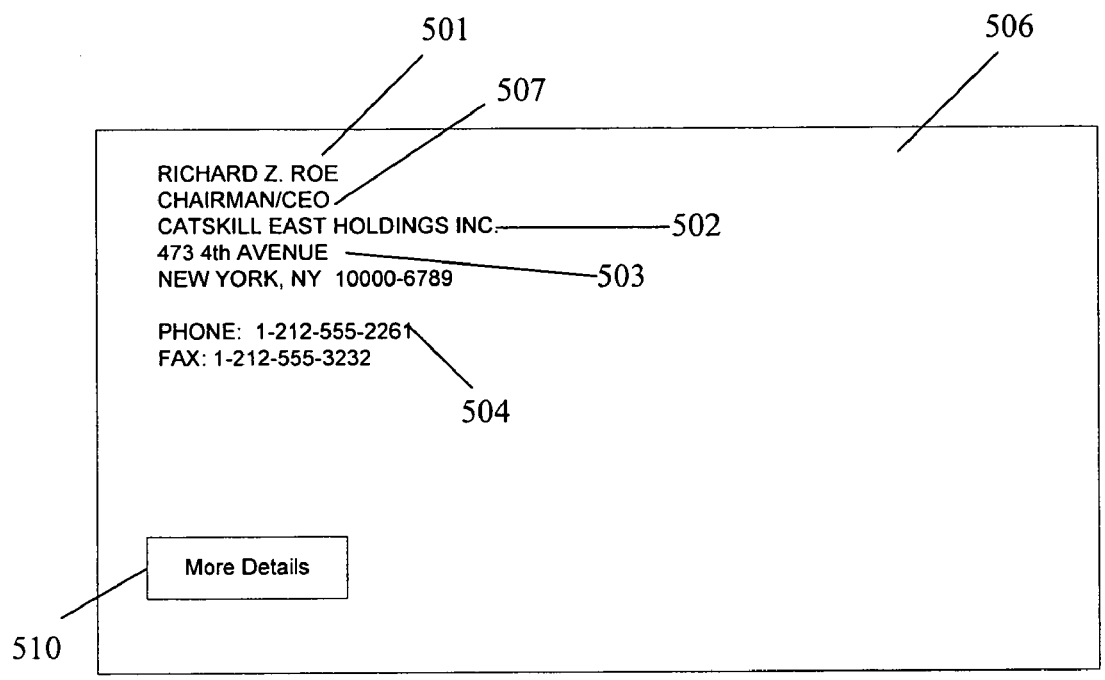
FIG. 6 depicts a user interface screen that displays biographic information about an individual.

If the analyst selects one of the transactions 402 and then selects the "Database Lookup" option, the system displays to the analyst information screen 500 illustrated in FIG. 6. This screen displays biographic and other information about the person associated with the transaction 402.

Once finished reviewing the transactions 402, the analyst selects the "Commit Records" option 427. In some embodiments the analyst may also have an additional option on transaction screen 400 to transfer a tagged document to a supervisor's work queue for further. The analyst may then proceed to work with the next tagged document in the work queue 220 (FIG. 2).

FIG. 6 illustrates a user interface screen 500 that displays a biographic profile of an individual. The profile presents information from the system's one or more databases, such as the individual's name 501, job title or titles 507, employer 502, address 503, and telephone numbers 504, insofar as these data are available. From this screen, the user, who may be an analyst, may retrieve further information, if available, by selecting the "More Details" control 510.

The user interface also provides a similar screen that displays corresponding information about an organization.

Figure 7:
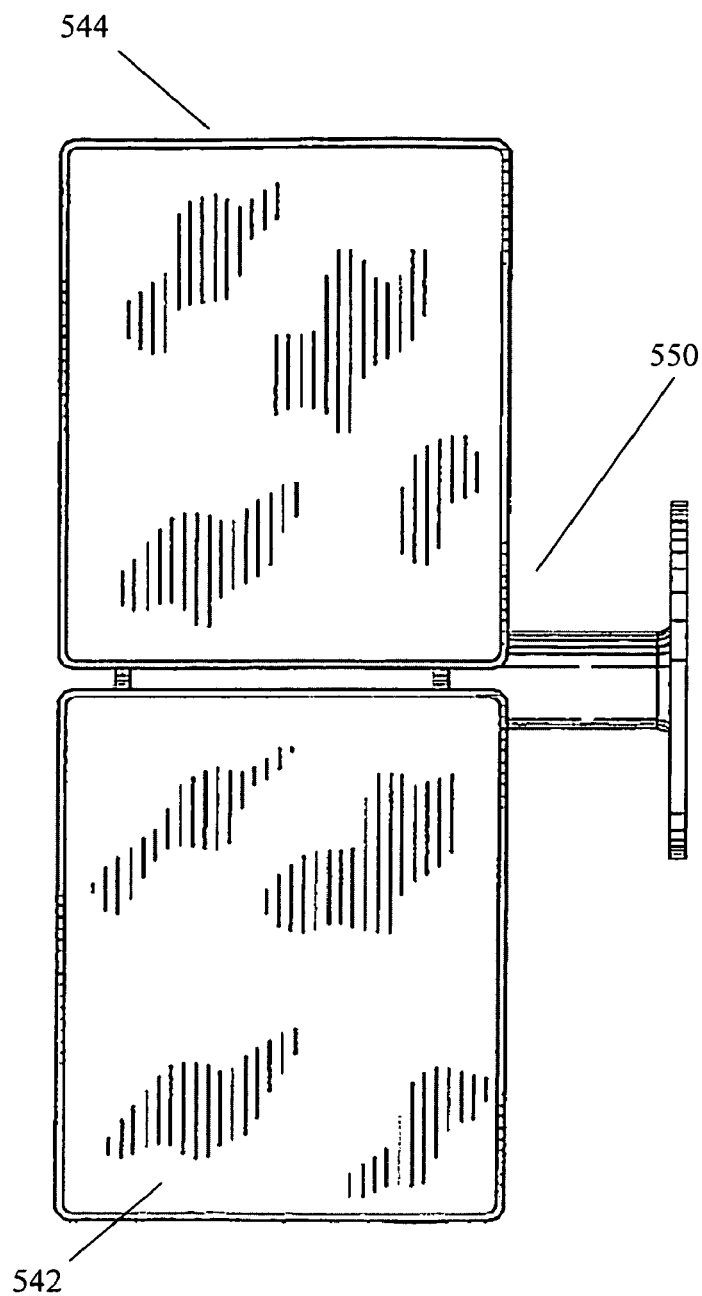
FIG. 7 depicts a dual display that uses two electronic display devices in a horizontal configuration.
Figure 8:
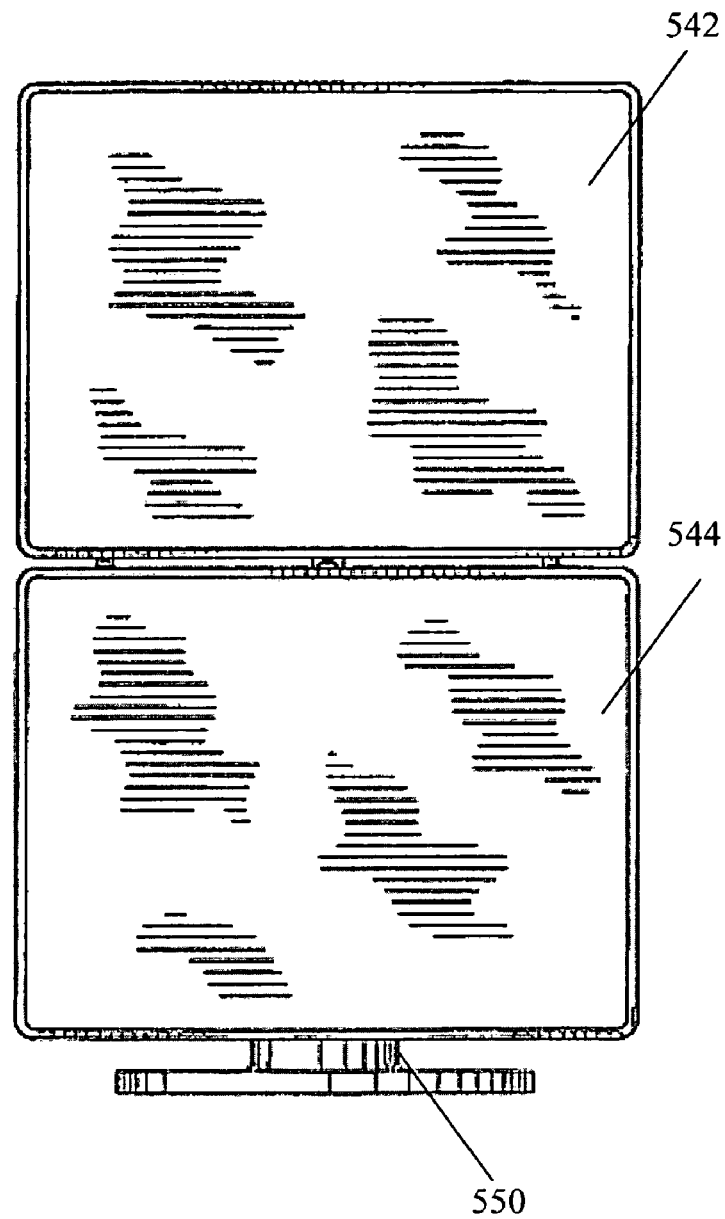
FIG. 8 depicts a dual display that uses two electronic display devices in a vertical configuration.

FIG. 7 and FIG. 8 are schematic diagrams of a dual display 540 that uses two electronic display devices. As is known in the art, the first display 542 and the second display 544 can be connected to the same computer but display different information. FIG. 7 illustrates such a display on which the dual display 540 is configured to present the first display 542 and the second display 544 side by side. FIG. 8 illustrates another version of a dual display 540 in which the first display 542 is directly above the second display 544. In both versions, the displays are supported and held in place by a stand 550.

Figure 9:
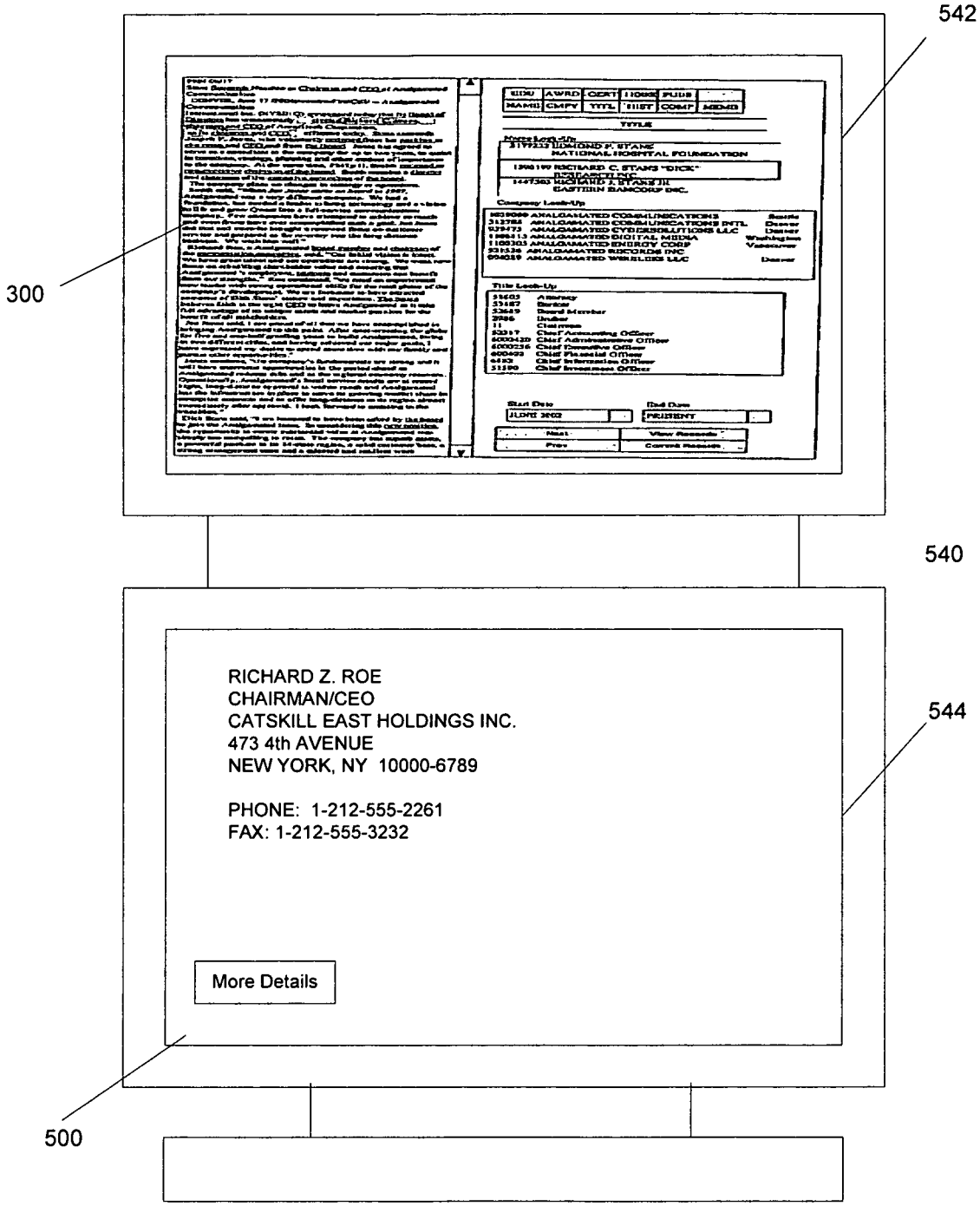
FIG. 9 depicts a dual display as may be used in an embodiment of the invention.

In the preferred embodiment of this invention, the data analyst uses a workstation with such a display. FIG. 9 illustrates use of a vertical dual display 540 with this embodiment, which allows an analyst to see additional information while creating transactions. For example, while working with the document viewer screen 300 (FIG. 4) on one display 542, the analyst may select one candidate name 342 (FIG. 4) that the system determined matches a tagged term 306 (FIG. 4). In response to that selection, the system may put screen 500 on the second display 544. By placing the relevant biographical information side-by-side with the tagged document, the system allows the analyst to confirm that the proper individual has been selected and to do so more quickly and efficiently than if the analyst had to navigate back and forth between screen 300 and screen 500 on a single display. It is irrelevant to this embodiment whether the dual display has a horizontal configuration as depicted in FIG. 7 or a vertical configuration as depicted in FIG. 8.

Similar behavior is also available when the system presents transaction screen 400 (FIG. 5) on the first display 542. When the data analyst selects a transaction 402 (FIG. 5) and then selects the "Database Lookup" option 426 (FIG. 5), the system will display the relevant biographical information in screen 544 on display 540.

Figure 10:
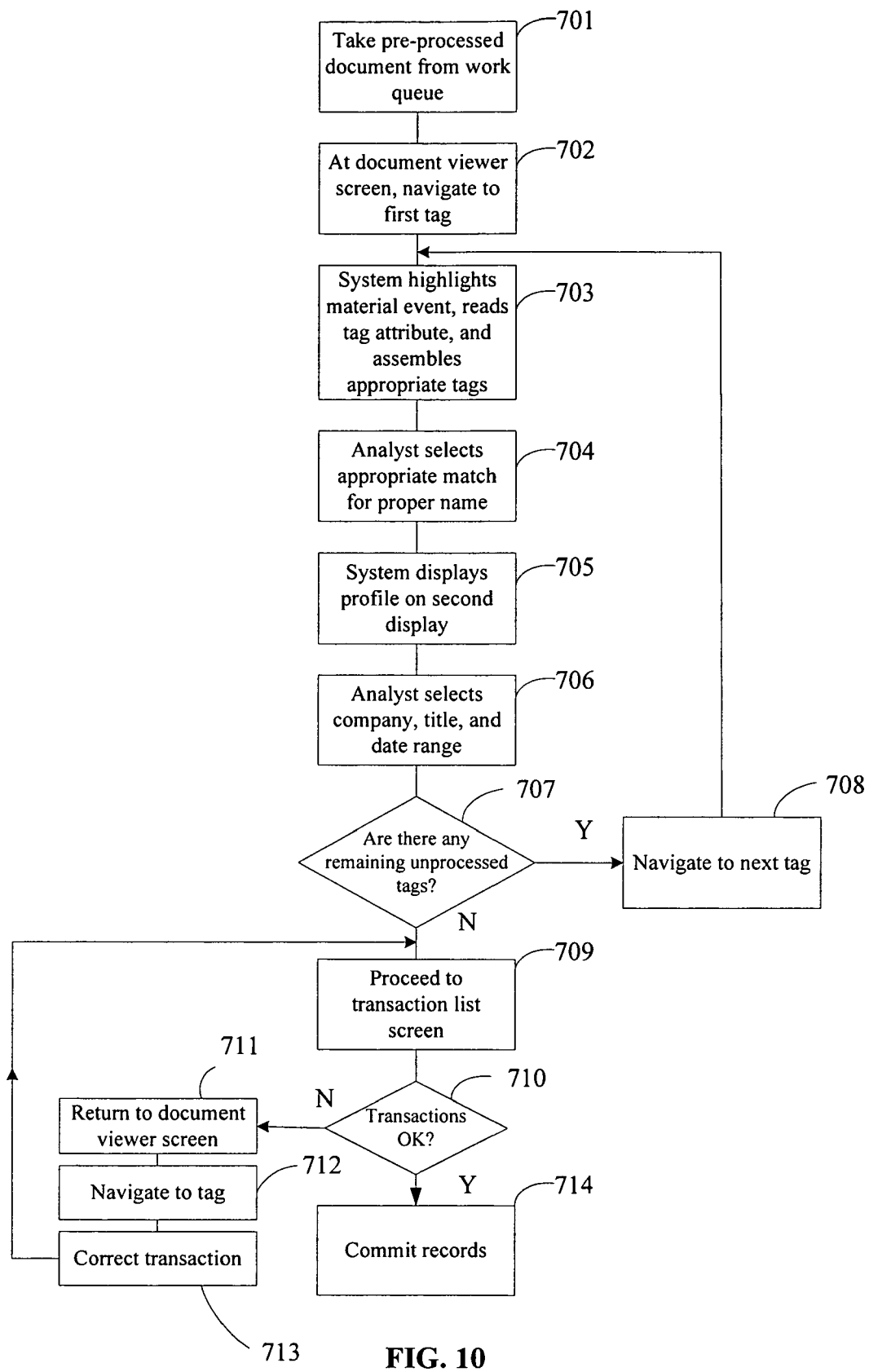
FIG. 10 is a flow diagram of preferred processes for gathering and processing information according to the invention.

FIG. 10 depicts the preferred way in which a data analyst processes a tagged document. Process 700 may be considered to begin with block 701, in which the data analyst takes the next available tagged document from the work queue.

Doing so causes document viewer screen 300 (FIG. 4) to appear on the first display 542 of the dual display 540. The tagged document appears in the document display region 301 (FIG. 4). In block 702, the data analyst then uses the "Next" button 371 and the "Prev" button 373 (FIG. 4) to navigate to the first tag in the tagged document. Alternatively in some embodiments of this system, the data analyst may use a mouse or other pointing device to select that first tag.

In response to the data analyst's selection of the first tag, the system moves to block 703. It highlights the words 317 (FIG. 4) in the tagged document that describe the event connected with the tag. It also reads the attributes of the tag and uses them to assemble the appropriate tools in the tool display region.

The tools selected will depend on the nature of the event. If, for example, the system determines that the event is the naming of an individual to a new position within a firm, the system will provide tools allowing the data analyst to confirm the proper name of the individual, the title associated with the new position, the company, and the date range to which the new information will apply.

Block 704 is a process done by the data analyst, which comprises selecting the proper name that matches the individual described in the tagged text, from the list of potentially matching names provided by the system. In response to the selection of a proper name, the system goes to block 705 to display a screen 500 (FIG. 6), containing a biographic profile, on the second display of the dual display.

For the block 706, the data analyst similarly selects the company, title, and date range. Just as in block 705, the system will display a profile of the organization on the second display when the data analyst selects a company from the list of potential matches.

Blocks 703 through 706 create a proposed database entry. Those blocks repeat until the data analyst has processed all the tags in the tagged document. In so doing, the data analyst thus creates a proposed database entry for each tag.

In this embodiment, however, the data analyst cannot commit the proposed database entries to any databases from the document viewer screen. Thus, block 709 consists of selecting the "View Records" option 372 (FIG. 4), which causes the system to display the transaction list screen 400 (FIG. 5) on display the first display.

Viewing the transaction list screen, the data analyst can review the proposed database entries (also called "transactions"), which is block 710. If the data analyst concludes that the proposed transactions are correct, the data analyst selects the "Commit Records" option 427 (FIG. 5), which leads to block 714: committing the transactions to the one or more databases.

If the review of the proposed transactions 710 indicates that a transaction needs to be changed or deleted, the data analyst selects the row 402 (FIG. 5) corresponding to that transaction and then selects the "Database Lookup" option. In response to this action, block 711 returns the document viewer screen 300 (FIG. 4) to the first display 542 (FIG. 7). When the system brings up the document viewer screen, the system has highlighted the event corresponding to the selected transaction. If the data analyst wishes to modify a different transaction, the data analyst may navigate 712 to the desired tag and correct it 713.

After correcting the necessary transaction or transactions, the data analyst again selects the "View Records" option, bringing up the transaction list screen again on the first display. The process then returns to block 709 as described above.

Once the data analyst chooses to commit the transactions 714, the process is complete, and the data analyst may begin work on the next tagged document in the work queue 220 (FIG. 2).

Embodiments of the invention may provide facilities other than, and/or in addition to, those depicted in FIG. 8. For example, embodiments may allow the data analyst 222 to manually add, edit, and/or remove tags.

It will be understood by those skilled in the art that the systems and processes depicted in FIGS. 2 and 10 and elsewhere are merely examples of many possible system arrangements that may be employed to carry out the invention detailed herein. The systems depicted herein should be viewed as merely illustrative. The systems and software referenced herein include, either explicitly or implicitly, software implemented on computers or other appropriate hardware, including such other intelligent data processing devices having a processor, data storage means, and the ability to support an operating system, with or without user interfaces, for example, file servers, as may be useful in achieving the objectives of the invention.

Software components and applications embodying the invention can be distributed in electronic bit storage on magnetic, optical, bubble, or other media, and optionally in transportable form to be interactive with an electronic reading device, for example, on computer or optical diskettes, or may be distributed over wired or wireless networks for storage by the recipient on such media.

It will further be appreciated that such media-stored software constitutes an electronic customizing machine which can interact with a magnetically or optically cooperative computer-based input device enabling the computer to be customized as a special-purpose computer, according to the contents of the software. When so configured, the special-purpose computer device has an enhanced value, especially to the professional users for whom it may be intended.

The invention claimed is:

1. A computerized method for maintaining information about individuals and/or organizations in databases, comprising:

acquiring in electronic form a source document describing one or more events involving one or more individuals and/or organizations;

at least one computer identifying in the electronic source document terms, including terms comprising a proper name, corresponding to respective terms in one or more preconfigured lists of terms, of which one or more of the preconfigured lists comprises terms including at least one proper name;

the at least one computer tagging identified terms in the electronic source document;

for each tagged term including a proper name, the at least one computer searching one or more databases for records that may represent individuals and/or organizations that carry that proper name or a similar one and retrieving one or more of such records;

the at least one computer identifying one or more events described in the electronic source document by applying one or more rules to identify relationships involving terms in the electronic source document;

for each of the one or more events identified in the electronic source document:

the at least one computer presenting the electronic source document, with at least one term and the event contrasted, on an electronic display device;

the at least one computer accepting user input through at least one computer input device to accept or to reject the identification of the contrasted event; and if the contrasted event is accepted, the at least one computer creating a tentative database transaction to record the event including terms of the identified relationships;

the at least one computer accepting additional user input through the at least one computer input device directing that the tentative database transactions be committed to one or more databases;

in response to the additional user input through the at least one computer input device, the at least one computer altering records contained in one or more databases to reflect the one or more events accepted by the user; and storing the electronic source document in a memory device for possible later retrieval.

2. The method of claim 1, comprising the at least one computer accepting user input though the at least one computer input device to add a manual identification of a term and/or an event in the electronic source documents, to modify a manually and/or automatically identified term and/or event, and/or to delete a manually and/or automatically identified term and/or event.

3. The method of claim 1, comprising the at least one computer removing all markup, metadata, and non-textual content from the electronic source document.

4. The method of claim 1, comprising:

for each of the one or more events identified in the electronic source document:

the at least one computer presenting on the electronic display device, along with the electronic source document, one or more of the proper names comprised by any term of an identified relationship, and, for one or more of the presented proper names, presenting a list of terms that include a matching or similar proper name; and in response to user input through the at least one computer input device, the at least one computer associating at least one of the presented proper names with a term from the presented list; and in response to additional user input through the at least one computer input device, the at least one computer updating at least one database record associated with at least one proper name associated with a term from a presented list to reflect the associated event.

5. The method of claim 4, comprising:

in response to the user input through the at least one computer input device, the at least one computer selecting one of the listed matching or similar database records;

the at least one computer changing the display on the electronic display device to indicate that the database record has been selected; and the at least one computer displaying on a second electronic display device information contained in the database record.

6. A system for maintaining information about individuals and/or organizations in databases, the system comprising:

at least one programmable processor, a memory operatively coupled to the at least one processor, an input interface operatively coupled to the at least one processor, an electronic display device operatively coupled to the at least one processor, and at least one computer input device operatively coupled to the at least one processor;

wherein the memory contains instructions that, when executed by at least one of the processors, causes the system to carry out a method that comprises acquiring in electronic form a source document describing one or more events involving one or more individuals or organizations;

identifying terms in the electronic source document, including terms comprising a proper name, from one or more preconfigured lists of terms, of which one or more of the preconfigured lists comprises terms including at least one proper name;

tagging identified terms in the electronic source document;

for each tagged term including a proper name, searching one or more databases for records that may represent individuals and/or organizations that carry that proper name or a similar one and to retrieve one or more of such records;

identifying one or more events described in the electronic source document by applying one or more rules to identify relationships involving the terms in the electronic source document;

for each of the one or more events identified in the electronic source document: (i) presenting the electronic source document, with at least one of the tagged terms and the event contrasted, on an electronic display device, (ii) accepting user input through at least one computer input device to accept or to reject the identification of the contrasted event, and (iii) if the contrasted event is accepted, creating a tentative database transaction to record the event including the associated terms;

accepting user input through the at least one computer input device directing that the tentative database transactions be committed to one or more databases;

in response to the user input, altering records contained in one or more databases to reflect the one or more events accepted by the user; and storing the electronic source document in a memory device for possible later retrieval.

7. The system of claim 6, wherein the method comprises accepting user input through at least one computer input device to add a manual identification of a term and/or an event, to modify a manual and/or automatic identification of a term and/or an event, and/or to delete a manual and/or automatic identification of a term and/or an event.

8. The system of claim 6, wherein the method comprises removing all markup, metadata, and non-textual content from the electronic source document.

9. The system of claim 6, wherein the method comprises:
for each of the one or more events identified in the electronic source document:
presenting on the electronic display device, along with the electronic source document, one or more of the proper names comprised by any term of an identified relationship and, for one or more of the presented proper names, a list of the matching or similar database records; and
in response to user input through at least one computer input device, associating each of the presented proper names with one of the listed matching or similar database records; and
in response to additional user input through the at least one computer input device, updating at least one database record associated with at least one proper name associated with a term from a presented list to reflect the associated event.

10. The system of claim 9, wherein the computer system comprises a second electronic display device that is operatively coupled to at least one of the processors and wherein the method comprises:
in response to the user input through the at least one computer input device, selecting one of the listed matching or similar database records;
changing the display on the electronic display device to indicate that the database record has been selected; and
displaying on a second electronic display device information contained in the database record.

11. A computer program product, comprising a computer readable storage medium or media encoded with computer-readable instructions that, when executed on at least one processor within a computer system, cause the computer system to perform a method, comprising:
acquiring in electronic form a source document describing one or more events involving one or more individuals and/or organizations;
identifying in the electronic source document terms, including terms comprising a proper name, corresponding to respective terms in one or more preconfigured lists of terms, of which one or more of the preconfigured lists comprises terms including at least one proper name;
tagging identified terms in the electronic source document;
for each tagged term including a proper name, searching one or more databases for records that may represent individuals and/or organizations that carry that proper name or a similar one and retrieving one or more of such records;
identifying one or more events described in the electronic source document by applying one or more rules to identify relationships involving terms in the electronic source document;
for each of the one or more events identified in the electronic source document:
presenting the electronic source document, with at least one term and the event contrasted, on an electronic display device;
accepting user input through at least one computer input device to accept or to reject the identification of the contrasted event; and
if the contrasted event is accepted, creating a tentative database transaction to record the event including terms of the identified relationships;
accepting additional user input through the at least one computer input device directing that the tentative database transactions be committed to one or more databases;
in response to the additional user input through the at least one computer input device, altering records contained in one or more databases to reflect the one or more events accepted by the user; and
storing the electronic source document in a memory device for possible later retrieval.

12. The computer program product of claim 11, wherein the method comprises accepting user input through the at least one computer input device to add a manual identification of a term and/or an event in the electronic source documents, to modify a manually and/or automatically identified term and/or event, and/or to delete a manually and/or automatically identified term and/or event.

13. The computer program product of claim 11, wherein the method comprises removing all markup, metadata, and non-textual content from the electronic source document.

14. The computer program product of claim 11, wherein the method comprises:
for each of the one or more events identified in the electronic source document:
presenting on the electronic display device, along with the electronic source document, one or more of the proper names comprised by any term of an identified relationship, and, for one or more of the presented proper names, presenting a list of terms that include a matching or similar proper name; and
in response to user input through the at least one computer input device, associating at least one of the presented proper names with a term from the presented list; and
in response to additional user input through the at least one computer input device, updating at least one database record associated with at least one proper name associated with a term from a presented list to reflect the associated event.

15. The computer program product of claim 14, wherein the method comprises:
in response to the user input through the at least one computer input device, selecting one of the listed matching or similar database records;
changing the display on the electronic display device to indicate that the database record has been selected; and
displaying on a second electronic display device information contained in the database record.

* * * * *